(12) United States Patent
Nousiainen

(10) Patent No.: US 7,904,740 B2
(45) Date of Patent: Mar. 8, 2011

(54) POWER SUPPLY EFFICIENCY OPTIMIZATION

(75) Inventor: Jaakko Nousiainen, Salo (FI)

(73) Assignee: Nokia Corporation, Espoo (FI)

( * ) Notice: Subject to any disclaimer, the term of this patent is extended or adjusted under 35 U.S.C. 154(b) by 770 days.

(21) Appl. No.: 11/904,739

(22) Filed: Sep. 28, 2007

(65) Prior Publication Data

US 2009/0089600 A1   Apr. 2, 2009

(51) Int. Cl.
*G06F 1/00* (2006.01)
*G05F 1/00* (2006.01)
*G05F 3/16* (2006.01)
*H02M 3/156* (2006.01)

(52) U.S. Cl. ......... 713/323; 713/320; 323/271; 323/282; 323/317; 323/351; 455/574

(58) Field of Classification Search .................. 713/320, 713/323; 323/271, 282, 317, 351; 455/574
See application file for complete search history.

(56) References Cited

U.S. PATENT DOCUMENTS

| 5,657,257 | A  |   | 8/1997  | Lee .............................. 364/707 |
| 5,926,394 | A  | * | 7/1999  | Nguyen et al. ................... 716/1 |
| 5,999,421 | A  |   | 12/1999 | Liu ................................. 363/21 |
| 6,092,207 | A  |   | 7/2000  | Kolinski et al. ............... 713/323 |
| 6,150,798 | A  |   | 11/2000 | Ferry et al. .................... 323/273 |
| 6,181,895 | B1 |   | 1/2001  | Hirst .............................. 399/88 |
| 6,434,030 | B1 | * | 8/2002  | Rehm et al. .................... 363/97 |
| 6,441,591 | B2 |   | 8/2002  | Nokkonen ..................... 323/266 |
| 6,880,076 | B2 | * | 4/2005  | Greiner et al. .................... 713/1 |
| 7,370,213 | B2 | * | 5/2008  | Odaohhara ................... 713/300 |
| 7,417,489 | B2 | * | 8/2008  | Fujita et al. ................... 327/534 |
| 2001/0007134 | A1 |  | 7/2001  | Odaohhara ................... 713/300 |
| 2002/0121882 | A1 |  | 9/2002  | Matsuo et al. ................ 323/266 |
| 2003/0009702 | A1 |  | 1/2003  | Park ............................. 713/300 |
| 2004/0107370 | A1 | * | 6/2004 | Mosley ......................... 713/300 |
| 2005/0188233 | A1 |   | 8/2005  | Park ............................. 713/320 |
| 2006/0101295 | A1 | * | 5/2006 | Park ............................. 713/300 |

* cited by examiner

*Primary Examiner* — Stefan Stoynov
(74) *Attorney, Agent, or Firm* — Harrington & Smith

(57) ABSTRACT

Methods and apparatus operative in a portable electronic device having a processor and a switching mode power supply detect entry of the processor into a power saving mode during active operations and signal the switching mode power supply that the processor has entered a power saving mode. In response to the signaling the switching mode power supply optimizes its operating state in order to increase power supply efficiency.

15 Claims, 6 Drawing Sheets

| 9. MODE | 9. VCORE_SLP0 | 9. VCORE_SLP1 |
|---|---|---|
| 12. DEEP SLEEP (LOWEST POWER MODE) | 13.0 | 14.0 |
| 15. MEDIUM SLEEP (ALL PROCESSORS/HWA IDLE BUT CLOCKS ON) | 16.0 | 17.1 |
| 18. LIGHT SLEEP (ONE PROCESSORS/HWA IDLE) | 19.1 | 20.0 |
| 21. FULLY ACTIVE (ALL PROCESSORS ON) MAX POWER MODE | 22.1 | 23.1 |

POWER SUPPLY EFFICIENCY OPTIMIZATION

TECHNICAL FIELD

The invention generally concerns power control in battery-powered portable electronic devices and more particularly concerns signaling operating modes of processors and other power-consuming devices in portable electronic devices to power supplies so that the power supplies can select operating modes in order to improve efficiency and transient performance.

BACKGROUND

Many portable electronic devices (mobile phones are a good example) require high performance microprocessors/digital signal processors and hardware accelerators (HWA) to support the high data rates and high video quality. Such high performance microprocessors, digital signal processors and hardware accelerators in turn require high peak current power supplies. These power supplies are normally made from switched mode power supplies and are designed to handle the maximum currents efficiently. However these same power supplies also are required to operate very efficiently for low power audio applications such as voice calls or music playback.

Modern processor designs employ clock gating control (e.g. arm wait for interrupt, C55X idle) in order to reduce power but the power supply is not aware of this and continuously supports the maximum current requirement. Such support is maintained since the current will increase immediately when an interrupt occurs. However, such modes of operation have several drawbacks. In particular, continuously maintaining the power supply in a state of readiness for operating modes that may or may not occur degrades the efficiency of the power supply and particularly the expected battery life. In addition, transient response is less than optimal, in particular when switching into a low power mode when the power supply is designed to expect a high power mode. Accordingly, those skilled in the art seek apparatus, methods and computer program products that overcome the limitations of the prior art.

SUMMARY OF THE INVENTION

A first embodiment of the invention is a portable electronic device comprising: at least one power supply configured to operate in at least two power supply operating modes; to receive operating mode signals from at least one other component of the portable electronic device; and to change power supply operating modes in dependence on the operating mode signals received from the at least one other component; at least one processor configured to operate in at least two processor operating modes; and control apparatus configured to detect a change in the processor operating mode of the at least one processor and to transmit an operating mode signal indicating the change in the processor operating mode to the power supply.

A second embodiment of the invention is a method comprising: in a portable electronic device having a switching mode power supply and at least one processor, the at least one processor configured to operate in at least two processor operating modes, detecting a change in the processor operating mode of the at least one processor; transmitting an operating mode signal indicating the change in the processor operating mode to the switching mode power supply; receiving the signal at the switching mode power supply; and changing a power supply operating mode of the switching mode power supply in dependence on receipt of the operating mode signal.

A third embodiment of the invention is a computer program product comprising a computer readable memory medium storing a computer program configured to be executed by control apparatus of a portable electronic device, the portable electronic device having at least one processor and at least one switching mode power supply, wherein when executed the computer program product is configured to cause the portable electronic device to detect a change in processor operating mode of the at least one processor; to transmit a signal indicating the change in the processor operating mode to the switching mode power supply; to receive the signal at the switching mode power supply; and to change a power supply operating mode of the switching mode power supply in dependence on receipt of the signal indicating the change in the processor operating mode.

A fourth embodiment of the invention is a portable electronic device comprising: power supply means for supplying power to other components of the portable electronic device; for operating in at least two power supply operating modes when supplying power to the other components; for receiving operating mode signals from at least one other component of the portable electronic device; and for changing power supply operating modes in dependence on the operating mode signals received from the at least one other component; processor means for performing processor operations and for operating in at least two processor operating modes when performing processing operations; and control means for detecting a change in the operating mode of the processor means and for transmitting an operating mode signal indicating the change in the processor operating mode of the processor means to the power supply means.

A fifth embodiment of the invention is an integrated control circuit for use with a power supply in a portable electronic device, the integrated control circuit comprising control apparatus configured to receive an operating mode signal from at least one power-consuming component of the portable electronic device, the operating mode signal indicating a change in the operating mode of the at least one power-consuming component of the portable electronic device; and to change the operating mode of the power supply in dependence on the operating mode signal received from the at least one power-consuming component of the portable electronic device.

In conclusion, the foregoing summary of the embodiments of the present invention is exemplary and non-limiting. For example, one of ordinary skill in the art will understand that one or more aspects or steps from one embodiment can be combined with one or more aspects or steps from another embodiment to create a new embodiment within the scope of the present invention.

BRIEF DESCRIPTION OF THE DRAWINGS

In the attached Drawing Figures:

FIG. 4 is a table depicting signaling modes to be used to signal a power supply in a portable electronic device operating in accordance with the invention;

DETAILED DESCRIPTION

Embodiments of the invention make use of processor power saving modes that already exist to signal to the power supply in advance of the change in load so as to enable improved power supply efficiency while also achieving good load transient response. The invention communicates processor idle state information to the power supply so that the power supply can optimize its efficiency during the periods when one or more processors are waiting for an interrupt. Similarly, when the host device is completely idle (often termed deep sleep mode whereby all high frequency clocks are disabled) the power supply can be optimized for this case.

The concept of deep sleep low power supply optimization has not been extended to address active modes or load transient management. Existing solutions attempt to determine the correct mode automatically in the power supply device by sensing the load but cannot achieve as good performance as would be possible with the present invention since conventional approaches have to tradeoff improved efficiency against worst load transient response/greater voltage margin as they do not have prior knowledge when the load will increase.

In portable electronic devices the continuously increasing microprocessor, digital signal processor and hardware accelerator clock frequencies mean that the maximum current required for the core power supply in portable electronic devices is increasing while the current used in typical applications like voice calls and music playback remain much lower. This in turn creates a problem that the switched mode power supply (SMPS) cannot meet the same efficiency target over such a wide range of currents which reduces the overall operating times for battery powered devices. In addition the large change in current causes a load transient which momentarily lowers the voltage and requires the normal voltage to have to be increased to ensure adequate margin. This invention addresses this issue by making use of the inherent power saving sleep modes and communicating these to the power supply via a simple 2 pin interface.

Figure 1:
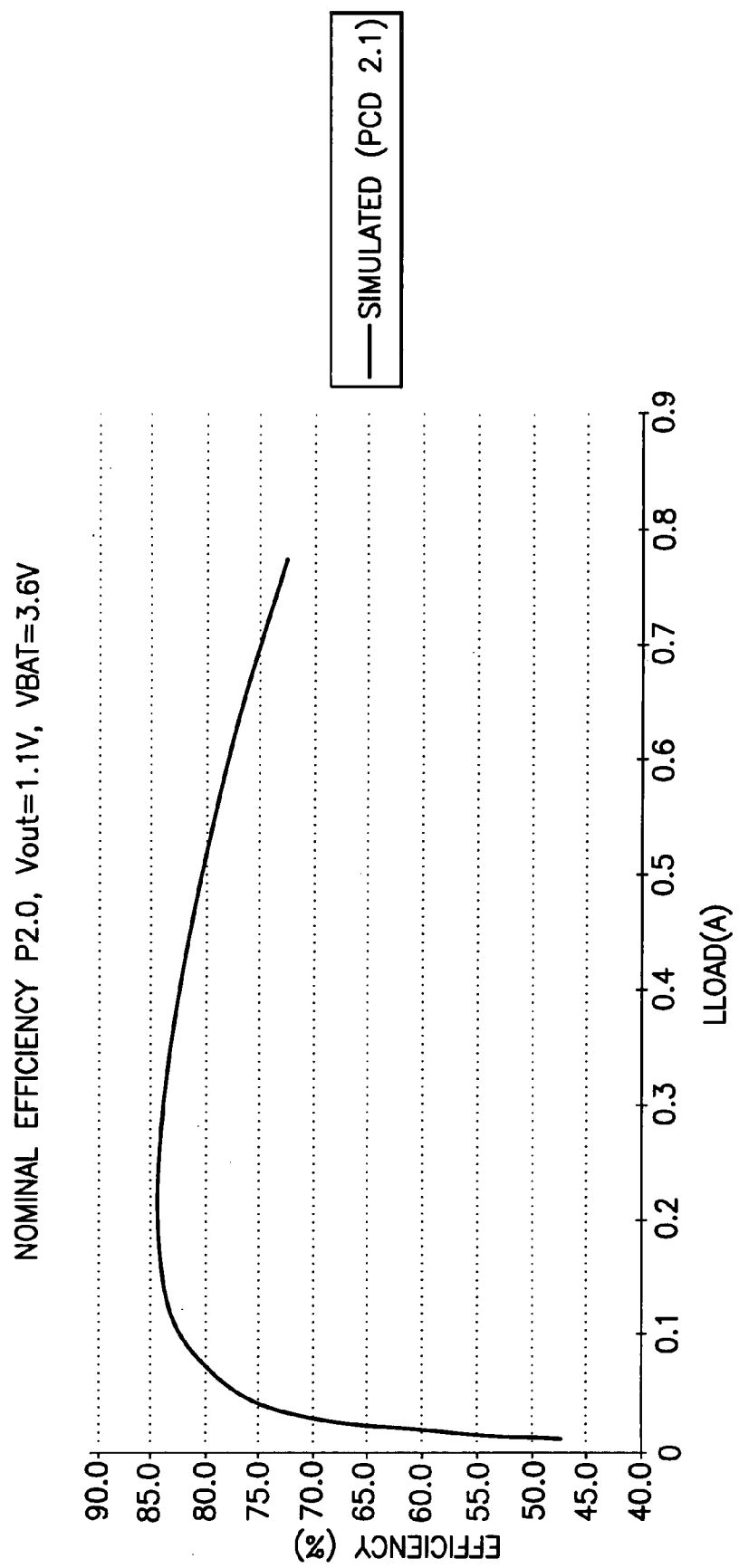
FIG. 1 is a chart depicting power efficiency of a power supply incorporated in a portable electronic device operating in accordance with the invention.
Figure 2:
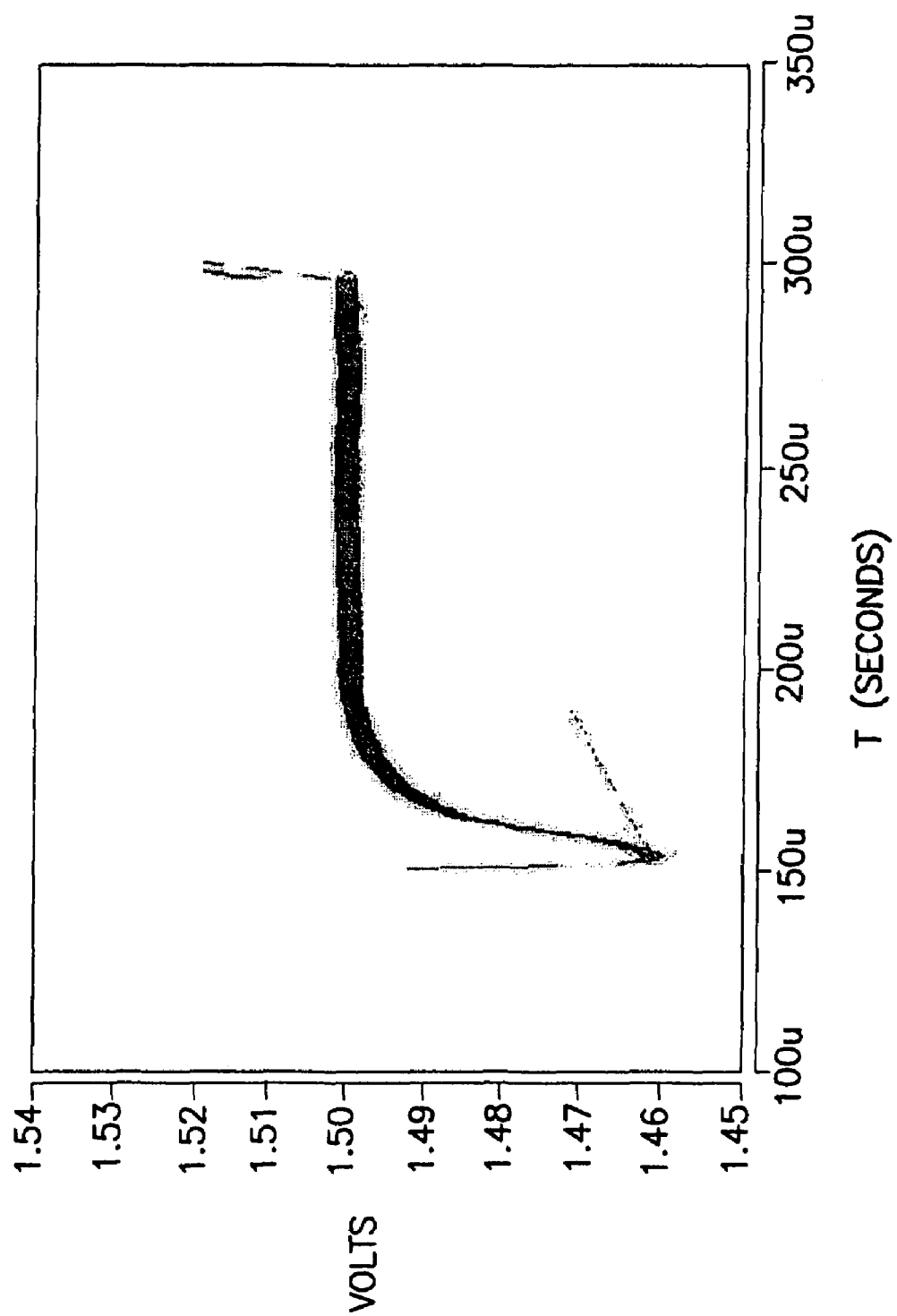
FIG. 2 is a chart depicting transient performance of a power supply incorporated in a portable electronic device operating in accordance with the invention.

FIG. 1 is a chart depicting a typical variation of the power supply efficiency over load current in accordance with the prior art, and FIG. 2 is a chart depicting transient response in accordance with the prior art.

Figure 3:
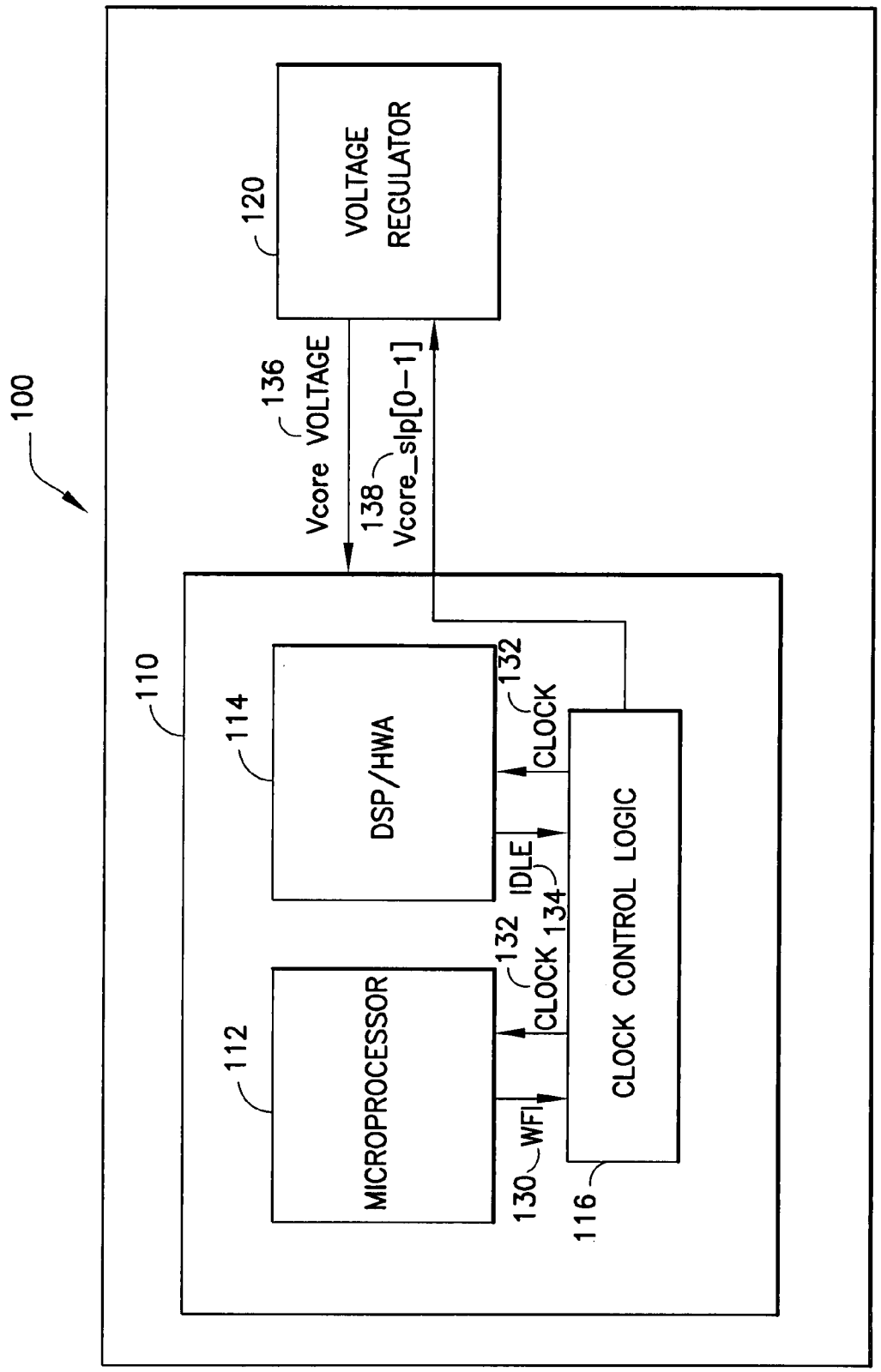
FIG. 3 is a block diagram of a portable electronic device configured to operate in accordance with the invention.

An example of the invention is shown in FIG. 3. FIG. 3 depicts a portable electronic device 10 (such as, for example, a mobile cellular telephone). The portable electronic device 100 further comprises a control block 110 having a microprocessor 112; digital signal processors/hardware accelerators 114; and clock control logic 116; and a voltage regulator/power supply 120. As is apparent, clock control logic provides clock signals 132 to the microprocessor 112 and the digital signal processor/hardware accelerators 114. The microprocessor 112 and digital signal processor/hardware accelerators in turn signal the clock control logic 116 their respective operating modes 130, 134. The clock control logic 116 in turn provides the operating mode information to the voltage regulator/power supply 120 using Vcore_slp[0-1] signal 138. The voltage regulator/power supply 120, in turn, uses this information to optimize its operating modes to improve battery efficiency and transient response when supply Vcore voltage 136 to the control block 110 of the portable electronic device 100.

Figure 5:
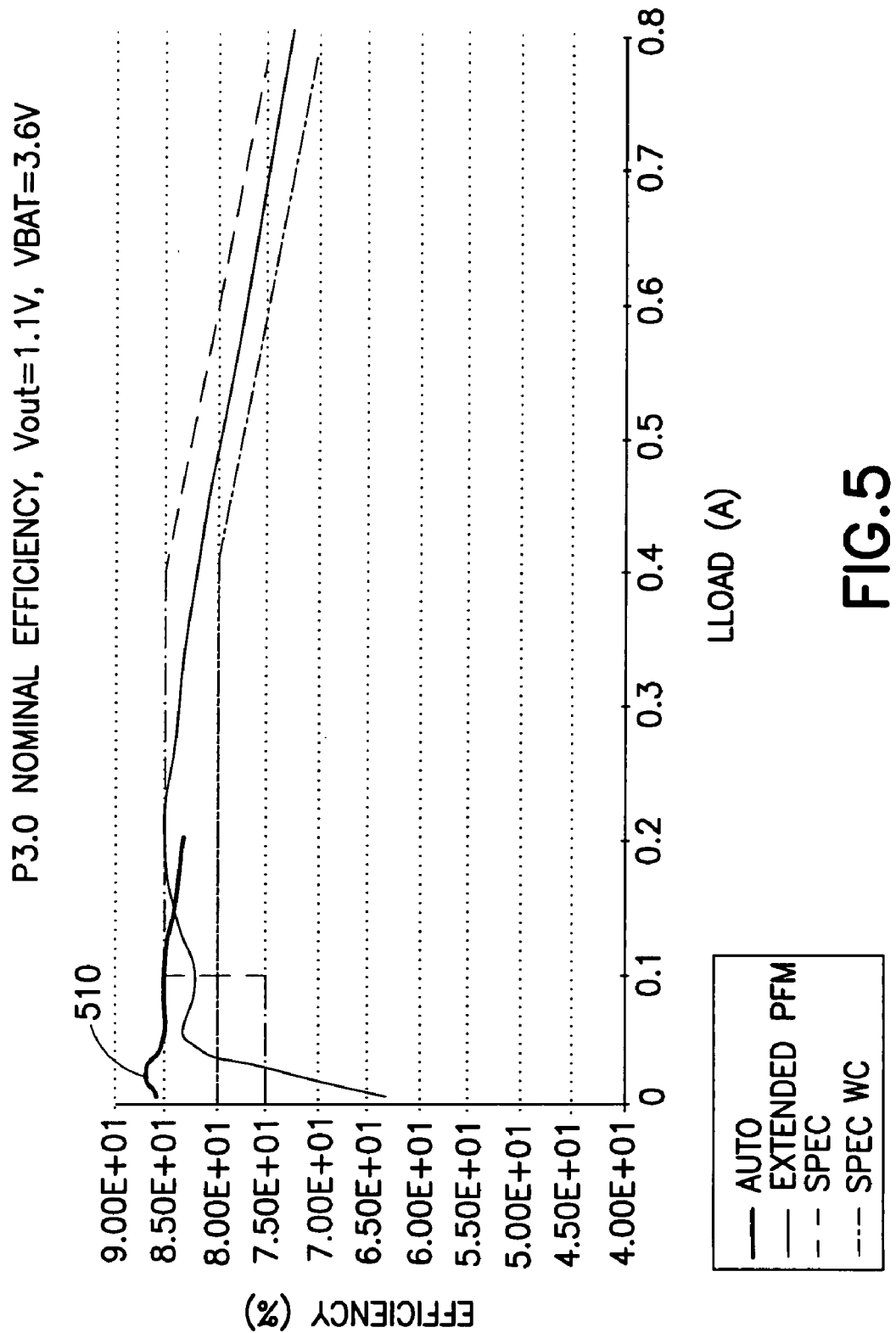
FIG. 5 is a chart depicting power efficiency gain of a power supply incorporated in a portable electronic device operating in accordance with the invention.

The clock control logic 116 performs the signaling as defined in table 1 depicted in FIG. 4. The efficiency improvement is shown by line 510 in FIG. 5. In addition when receiving an interrupt the clock control logic in embodiments of the invention can delay the processor wakeup a short time so as to allow the voltage regulator to switch mode before the current increases thereby improving the load transient performance. It would be possible to extend the control interface to 3 pins so as to include an acknowledge signal from the voltage regulator that is has settled in the new mode but in most designs a simple timer should be sufficient.

Figure 6:
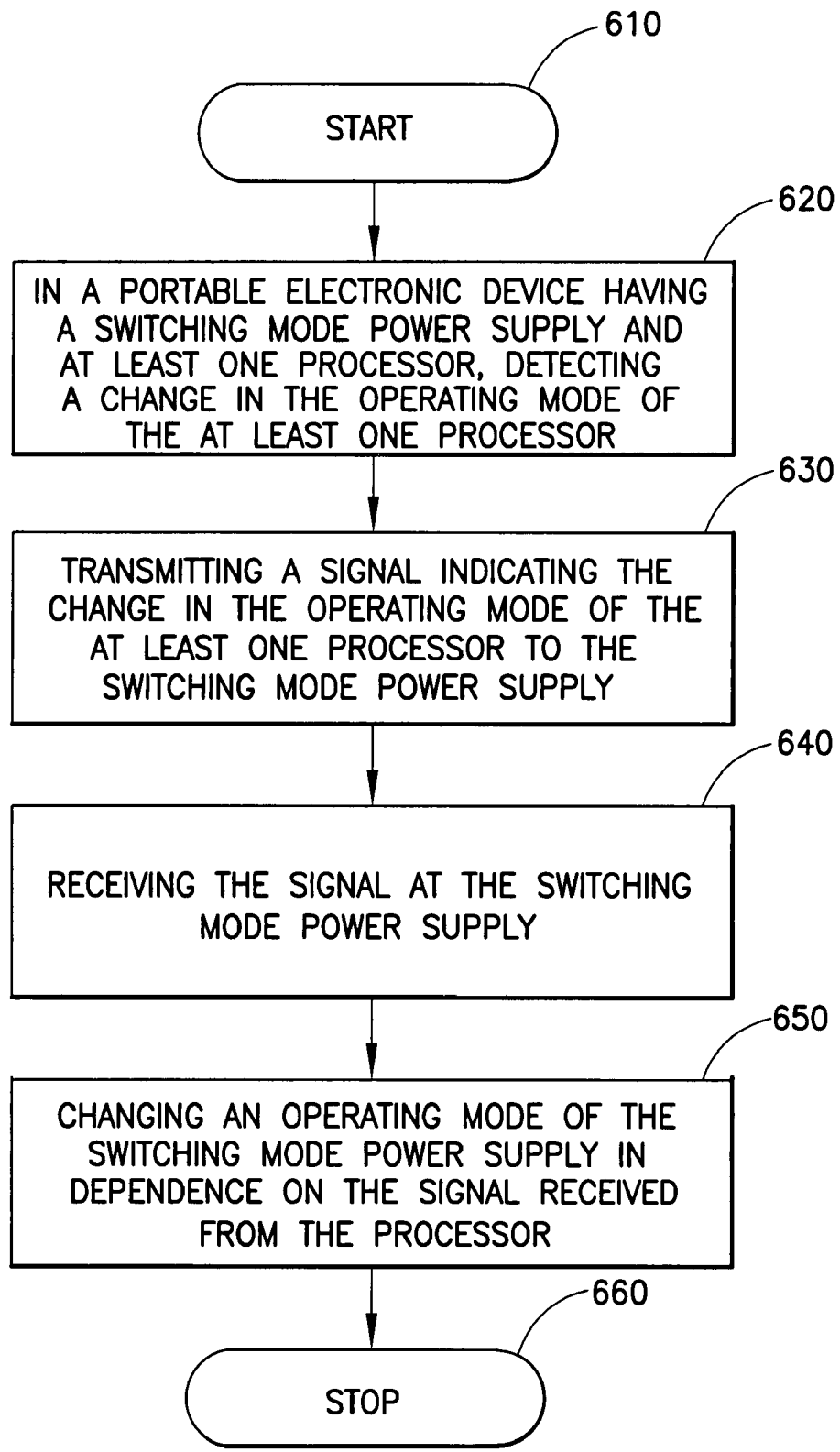
FIG. 6 is a flow chart depicting a method operating in accordance with the invention.

FIG. 6 is a flow chart depicting a method operating in accordance with the invention. The method is practiced in a portable electronic device having a switching mode power supply and at least processor. The at least one processor is configured to operate in at least two operating modes. The method starts at 610. Next, at 620, control apparatus of the portable electronic device detect a change in the operating mode of the at least one processor. Then, at 630, a signal is transmitted indicating the change in the operating mode of the at least one processor to the switching mode power supply. Next, at 640, the signal is received at the switching mode power supply. Then, at 650, the switching mode power supply changes operating mode in dependence on receipt of the signal indicating that the at least one processor has changed operating modes.

In one variant of the method depicted in FIG. 6, the switching mode power supply performs an additional step of transmitting an acknowledgement signal indicating the switching mode power supply has changed operating modes as a result of receiving the signal indicating that the at least one processor has changed operating modes.

In various embodiments, the change in the operating mode of the at least one processor may take several forms. In one variant, the change in the operating mode of the at least one processor is from an active mode to a power saving mode. In another variant, the change in the operating mode of the at least one processor is from a high power draw mode to a low power draw mode. In a further variant of the invention, the change in the operating mode of the at least one processor is from a high power draw active mode to a low power draw active mode. In yet another variant of the invention, the change in the operating mode of the at least one processor is from a power saving mode to an active mode. In a still further variant of the at least one processor the change in the operating mode is from low power draw mode to a high power draw mode. In another variant of the invention the change in the operating mode of the at least one processor is from a low power draw active mode to a high power draw active mode. As exemplary embodiments, the high power draw modes may be associated with signal processing associated with multimedia signals, and the low power draw modes may be associated with voice communications.

In another variant of the method depicted in FIG. 6, a control apparatus like that depicted in FIG. 3 is further configured to detect the change in the operating mode of the at least one processor before the change is implemented and to transmit the operating mode signal indicating that the at least one processor will change operating modes to the power supply before the change in the operating mode of the at least one processor is implemented.

In a further variant of the method of the invention depicted in FIG. 6, when a change in the operating mode of the at least one processor will be made, the at least one processor is further configured to delay implementing the change until the power supply has been signaled that a change in the operating mode of the at least one processor is imminent.

In yet another variant of the method depicted in FIG. 6, when a change in the operating mode of the at least one processor will be made, the at least one processor is further configured to delay implementing the change until the power supply has changed operating modes in anticipation of the change in the operating modes of the at least one processor.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it should be understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. For example, the described number of PRBs, as well as the various types of scheduling algorithms, are exemplary, and should not be read as limitations upon the practice of the exemplary embodiments of this invention. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus comprising at least one processor; and at least one memory including computer program code, the at least one memory and the computer program code configured to, with the at least one processor, cause the apparatus to perform at least the following:

to detect an imminent change in a processor operating mode of the at least one processor before the change in the processor operating mode is implemented;

in response to detecting the change in the processor operating mode, to transmit an operating mode signal indicating the change in the processor operating mode to a power supply before the change in the processor operating mode is implemented;

to delay implementing the change in the processor operating mode;

to receive an acknowledgement signal from the power supply indicating that the power supply has changed power supply operating modes as a result of receiving the operating mode signal; and in response to receiving the acknowledgement signal, to stop delaying implementing the change in the processor operating mode, wherein the operating mode signal comprises instructions indicating that the power supply is to change power supply operating modes before the change in the processor operating mode is implemented.

2. The apparatus of claim 1 wherein the power supply is a switching mode power supply.

3. The apparatus of claim 1 wherein the change in the processor operating mode of the at least one processor is from an active mode to a power saving mode.

4. The apparatus of claim 1 wherein the change in the processor operating mode of the at least one processor is from a high power draw mode to a low power draw mode.

5. The apparatus of claim 1 wherein the change in the processor operating mode of the at least one processor is from a high power draw active mode to a low power draw active mode.

6. The apparatus of claim 1 where the power supply comprises at least two power supplies, each of the at least two power supplies configured to operate in at least two power supply operating modes; to receive operating mode signals from at least one other component of the apparatus; and to change power supply operating modes in dependence on the operating mode signals received from the at least one other component.

7. The apparatus of claim 1 further comprising a two-pin interface configured to convey the operating mode signal indicating the change in the processor operating mode of the processor to the power supply.

8. The apparatus of claim 1, where the apparatus is embodied in an integrated circuit.

9. A method comprising:

detecting, at a control apparatus, an imminent change in a processor operating mode of at least one processor before the change in the processor operating mode is implemented; and in response to detecting the change in the processor operating mode, transmitting an operating mode signal indicating the change in the processor operating mode to a switching mode power supply before the change in the processor operating mode is implemented;

delaying implementing the change in the processor operating mode;

receiving an acknowledgement signal from the power supply indicating that the power supply has changed power supply operating modes as a result of receiving the operating mode signal; and in response to receiving the acknowledgement signal, stopping delaying implementing the change in the processor operating mode, wherein the operating mode signal comprises instructions indicating that the power supply is to change power supply operating modes before the change in the processor operating mode is implemented.

10. The method of claim 9 wherein the change in the processor operating mode of the at least one processor is from an active mode to a power saving mode.

11. The method of claim 9 wherein the change in the processor operating mode of the at least one processor is from a high power draw mode to a low power draw mode.

12. The method of claim 9 wherein the change in the processor operating mode of the at least one processor is from a high power draw active mode to a low power draw active mode.

13. The method of claim 9 wherein the change in the processor operating mode of the at least one processor is from a low power draw mode to a high power draw mode.

14. A computer readable memory medium tangibly encoded with a computer program executable by a control apparatus of a portable electronic device to perform actions, the portable electronic device having at least one processor and at least one switching mode power supply, wherein the action comprise:
- detecting an imminent change in the processor operating mode of the at least one processor before the change in the processor operating mode is implemented;
- in response to detecting the change in the processor operating mode, transmitting a signal indicating the change in the processor operating mode of the at least one processor to the switching mode power supply before the change in the processor operating mode is implemented;
- delaying implementing the change in the processor operating mode;
- receiving an acknowledgement signal from the power supply indicating that the power supply has changed power supply operating modes as a result of receiving the operating mode signal; and
- in response to receiving the acknowledgement signal, stopping delaying implementing the change in the processor operating mode, wherein the operating mode signal comprises instructions indicating that the power supply is to change power supply operating modes before the change in the processor operating mode is implemented.

15. An apparatus comprising:
- power supply means for supplying power to other components of the portable electronic device; for operating in at least two power supply operating modes when supplying power to the other components; for receiving operating mode signals from at least one other component of the portable electronic device; and for changing power supply operating modes in dependence on the operating mode signals received from the at least one other component;
- processor means for performing processor operations and for operating in at least two processor operating modes when performing processing operations; and
- control means for detecting an imminent change in the processor operating mode of the processor means before the change in the processor operating mode is implemented and for transmitting, in response to detecting the change in the processor operating mode, an operating mode signal indicating the change in the processor operating mode of the processor means to the power supply means before the change in the processor operating mode is implemented;
- means for delaying implementing the change in the processor operating mode;
- means for receiving an acknowledgement signal from the power supply indicating that the power supply has changed power supply operating modes as a result of receiving the operating mode signal; and
- means for stopping delaying implementing the change in the processor operating mode in response to receiving the acknowledgement signal, wherein the operating mode signal comprises instructions indicating that the power supply means is to change power supply operating modes before the change in the processor operating mode is implemented.

* * * * *